United States Patent [19]

Jarvstråt

[11] 4,010,102
[45] Mar. 1, 1977

[54] LIQUID TREATMENT APPARATUS HAVING PARALLEL ROTATING BAFFLES

[76] Inventor: Nils Göran Jarvstråt, Daggkapebacken 1, 552 46 Jonkoping, Sweden

[22] Filed: Feb. 10, 1975

[21] Appl. No.: 548,664

[30] Foreign Application Priority Data

Feb. 14, 1974 Sweden .............................. 7401946

[52] U.S. Cl. .................................. 210/151; 261/92
[51] Int. Cl.² .......................................... C02C 1/02
[58] Field of Search .......... 210/150, 151, 521, 522; 261/92

[56] References Cited

UNITED STATES PATENTS

| 2,458,163 | 1/1949 | Hays ......................... | 210/151 X |
| 3,617,225 | 11/1971 | Kuehn et al. ................... | 261/92 X |
| 3,732,160 | 5/1973 | Klock ............................ | 210/150 X |
| 3,875,058 | 4/1975 | Noargard ...................... | 210/151 |

Primary Examiner—John Adee
Attorney, Agent, or Firm—Frank C. Maley

[57] ABSTRACT

An apparatus for purification of waste water in a tank or a pool has a housing rotatably journalled on a raft and provided with pump means to force air and water therethrough. The housing contains first discs having central holes and a second discs having peripherical apertures at the wall of the housing. Each disc forms a baffle for air and water flows through the housing, thereby imparting a tortuous path to the air and water passing through the housing. The discs are corrugated and are arranged in a stack with the corrugations of adjacent discs oriented at right angles. The corrugations strengthen the discs and form support points at which the discs contact each other, and also define channels between the discs, through which channels of water and air can flow. A spiral pump rotating with the inlet end of the rotor forces metered volumes of water and air through the rotor.

12 Claims, 9 Drawing Figures

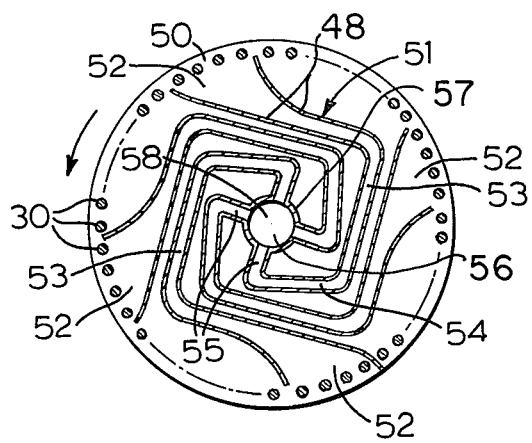
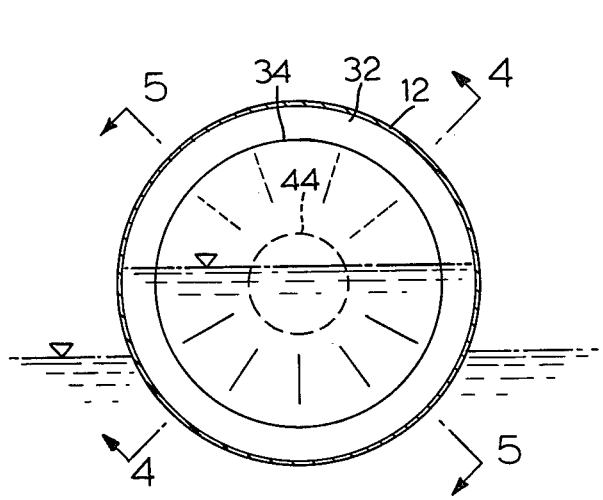
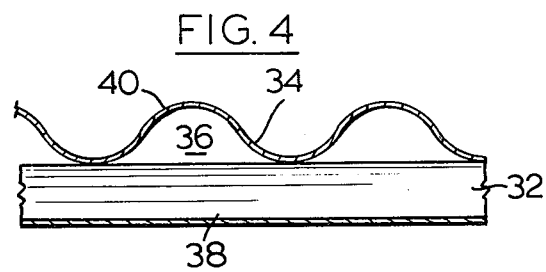
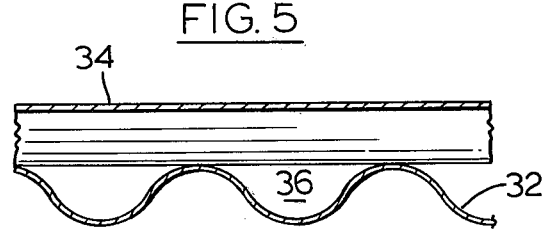
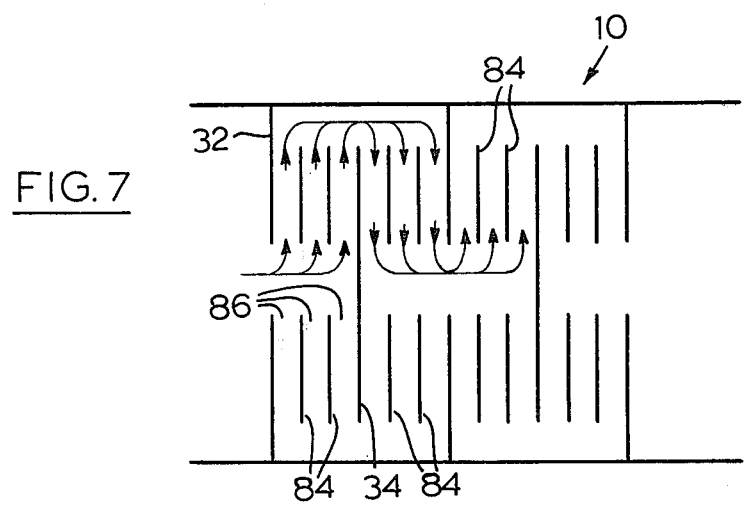

LIQUID TREATMENT APPARATUS HAVING PARALLEL ROTATING BAFFLES

This invention relates to apparatus for the biological treatment of liquid, typically water. In the apparatus of the invention, disc elements are aligned in an axial row and are rotated.

Prior arrangements employing rotatable discs for the biological treatment of liquid have had the disc elements joined to each other to form a screw or spiral within a housing. The manufacture of such a spiral or screw is complicated and expensive. In addition, screw rotors of this type have certain operating disadvantages. Firstly, an adequate air supply is important to obtain efficient biological purification. The volume of air screwed through a screw rotor of the kind previously used is usually inadequate in relation to the liquid flow through the rotor. It is difficult to arrange and connect a channel to provide an extra air supply to the rotor, and it is even more difficult to distribute air in the rotor evenly to the active surfaces of the rotor. It is not normally possible to increase the oxidation of the liquid by increasing the speed of rotation of the rotor, since the rotor will then screw through too high an amount of liquid.

Another component which affects the purification in a screw motor is the relation between the speed of the liquid in the rotor and the speed of the disc elements. In prior screw rotors, the speed of the liquid is the same as the rate of rotation of the disc elements, i.e. the speed varies from nearly zero at the axial centre of the rotor up to the real periphery speed of the elements; at the periphery of the elements. In other words, the speed of the liquid relative to that of the biologically active surfaces is very small.

Both of the above mentioned components affecting the efficiency of the apparatus can be improved by eliminating the need for the disc elements in the rotor to pump the liquid flow through the rotor. Instead of a spiral rotor, the present invention employs a baffle rotor.

These are several advantages of a baffle rotor according to the invention over known screw rotors. The rate of rotation of the baffle rotor can be adjusted independently of the liquid flow through the rotor. This permits an increase in the oxidation of the liquid simply by increasing the speed of rotation of the rotor. In the baffle rotor the relative speed, i.e. the speed of the liquid in relation to the biologically active surfaces, has two components, firstly a rotary component (tangential speed), and secondly a transfer speed in the radial direction. The rotary component increases with the distance from the axial centre, and the transfer speed decreases as the radial distance from the axial centre increases, since the flow area increases with that distance, but the flow remains constant. Since the one speed component increases where the other decreases, and vice versa, the resultant, i.e. the real relative speed, is more uniform in the baffle rotor than it is in a screw rotor.

When a baffle rotor is used, an air pump can be connected to one end of the rotor, and the air is then automatically evenly distributed over all of the biologically active surfaces above the liquid level in the rotor.

According to the invention in its broadest aspect there is provided apparatus for the biological treatment of waste liquid, said apparatus including an elongated housing for containing said liquid, said housing having an inlet opening, an outlet opening, and a central axis, a plurality of disc elements disposed within said housing, said disc elements being positioned substantially at right angles to said axis, some of said disc elements have central apertures at said axis and fitting closely at their peripheries to said housing, others of said disc elements defining second apertures located radially outwardly of said axis, said housing including both such types of disc elements alternating with each other, adjacent disc elements defining channels therebetween, whereby liquid and air impelled into said housing through said inlet opening will flow through said housing to said outlet opening in respective tortuous paths, and means for rotating said disc elements in the liquid in said housing.

An embodiment of the apparatus according to the invention will now be described by way of example, with reference to the accompanying drawings, in which:

FIG. 3 is a diagrammatic cross-section taken along lines 3—3 of FIG. 2;

FIG. 4 is a cross-sectional view taken along lines 4—4 of FIG. 3 and showing the detail of the disc elements of FIG. 3;

FIG. 5 is a view similar to FIG. 4 but taken along lines 5—5 of FIG. 3;

FIG. 6 is a cross-sectional view taken along lines 6—6 of FIG. 2, and showing a liquid and air pump used in the apparatus; and FIG. 7 is a diagrammatic cross-sectional view showing a modification of the rotor according to the invention;

Figure 1:
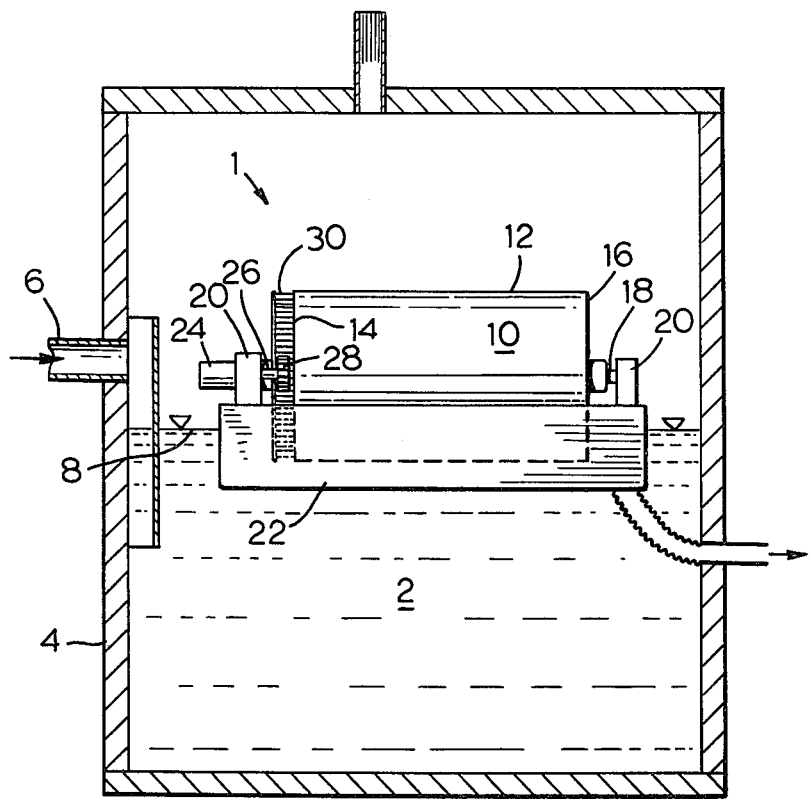
FIG. 1 is a view of treatment apparatus according to the invention, positioned in a tank.

Reference is first made to FIG. 1, which shows a treatment assembly 1 partly immersed in liquid 2 (typically waste water) in a tank 4. The liquid to be treated is supplied to the tank 4 via a pipe 6. The liquid level in the tank 4 is indicated by the horizontal line 8 marked by arrowheads in the drawing.

The assembly 1 includes a rotor 10 having a cylindrical wall 12, and end walls 14, 16 which with the cylindrical wall 12 define the housing of the rotor. The end walls 14, 16 carry outwardly turned hollowed stub axles 18 (FIG. 2) for journalling and carrying the rotor. The axles 18 are journalled in bearings (not shown) which are contained and supported by brackets 20 (FIG. 1). The brackets 20 are disposed on a raft 22 which supports the rotor 10 and floats it at the level indicated in FIGS. 1 and 2.

As shown in FIG. 1, the left hand bracket 20 supports an electric motor 24 which rotates the housing via a drive shaft 26 and a spur gear 28 thereon. Gear 28 drives the housing via a set of spaced rollers 30 which form a type of ring gear encircling the housing.

Figure 2:
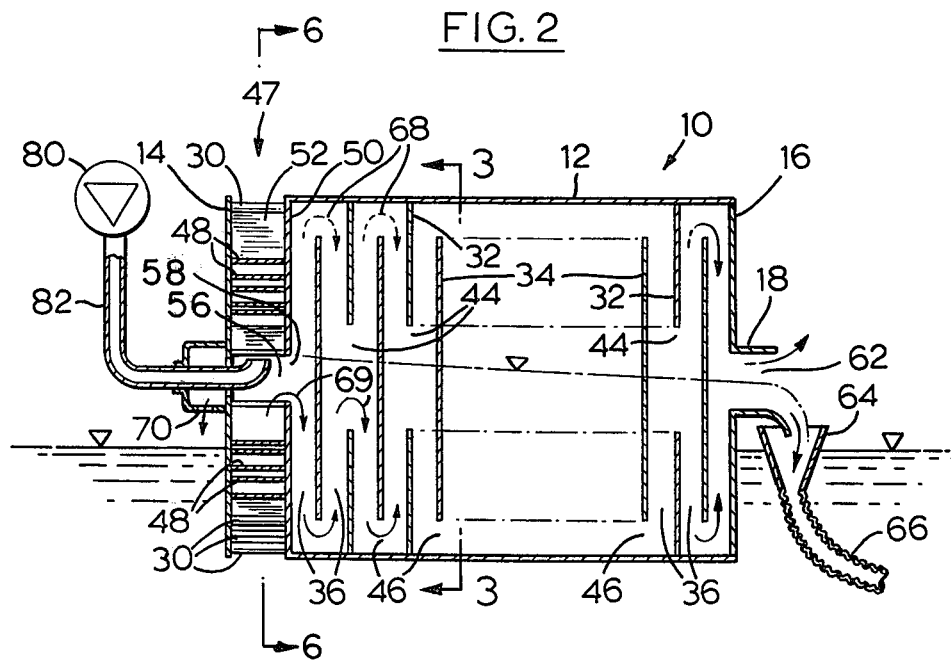
FIG. 2 is a diagrammatic longitudinal section through the axis of the rotor of FIG. 1.

As shown in FIG. 2, the rotor 10 contains a number of disc-shaped elements 32, 34 prepared for carrying activated sludge. The disc elements 32, 34 form a stacked unit which is enclosed by the housing and which can be removed as required for controlling and cleaning (for this purpose, end wall 16 is made removable). The disc elements are corrugated and define channels 36 therebetween, so that flows of liquid or air can pass from the centre towards the periphery of the discs or vice versa.

Figure 8:
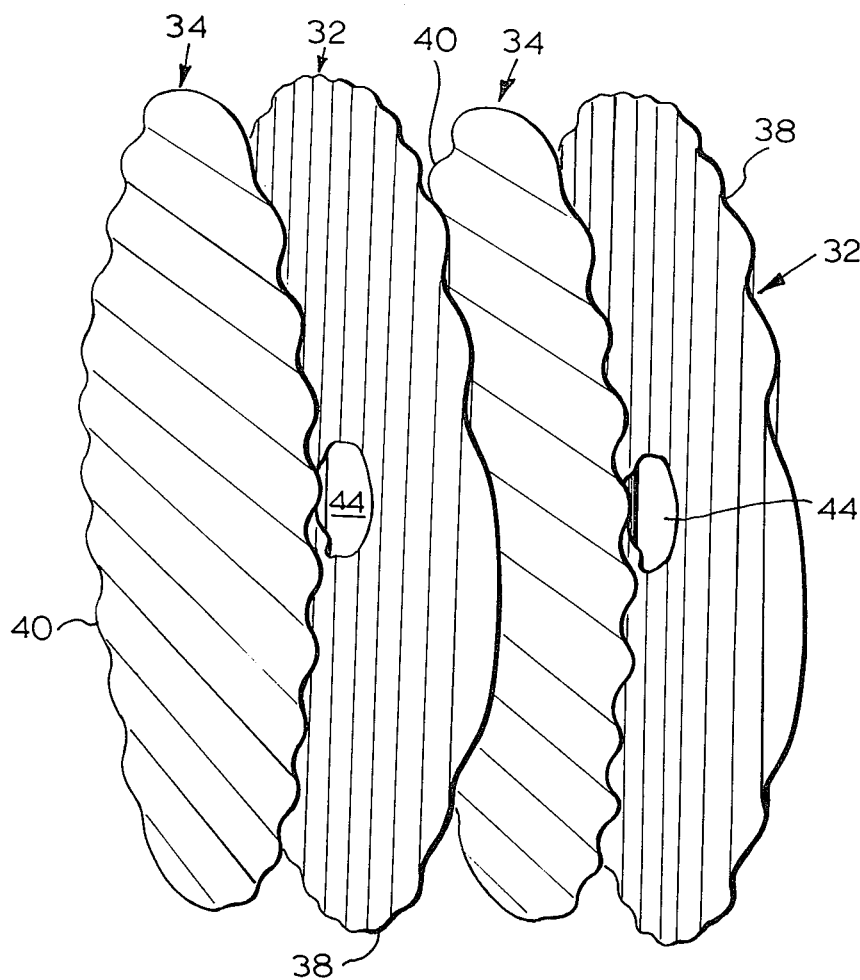
FIG. 8 is an exploded perspective showing the disc elements of FIGS. 3 and 4.

The corrugations and composition of two adjacent disc elements 32, 34 are shown in detail in FIGS. 4 and 5, and also in the exploded view of FIG. 8. As shown, each disc element 32, 34 includes a number of parallel corrugations 38, 40 respectively. The corrugations of one disc element are, in the embodiment illustrated, oriented at right angles to the corrugations of the adjacent disc element. Although the disc elements are in contact with each other, as shown in FIGS. 4 and 5, the spaces between the corrugations form the channels 16 previously referred to. The disc elements are held tightly axially together by their enclosure within the end plates of the housing of the rotor 10.

Because of the strengthening effect of the corrugations, and because there are numerous points at which each disc element is supported on its neighbouring disc elements, it is possible to use thin material for the disc elements while still maintaining adequately structural strength.

It will be seen from FIG. 2 that every disc element 32 in the rotor has a central axial hole 44 and extends to the cylindrical wall 12. The edges of the disc elements 32 are sufficiently tight against the wall 12 that they prevent passage of any substantial volume of liquid past their peripheries. The elements 34, which are co-axial with and are located between the disc elements 32, are of smaller diameter than the disc elements 32 and do not have a central axial hole. Instead, the disc elements 34 define between themselves and the cylindrical wall 12 an annular aperture 46 encircling their peripheries and through which liquid may pass.

Figure 9:
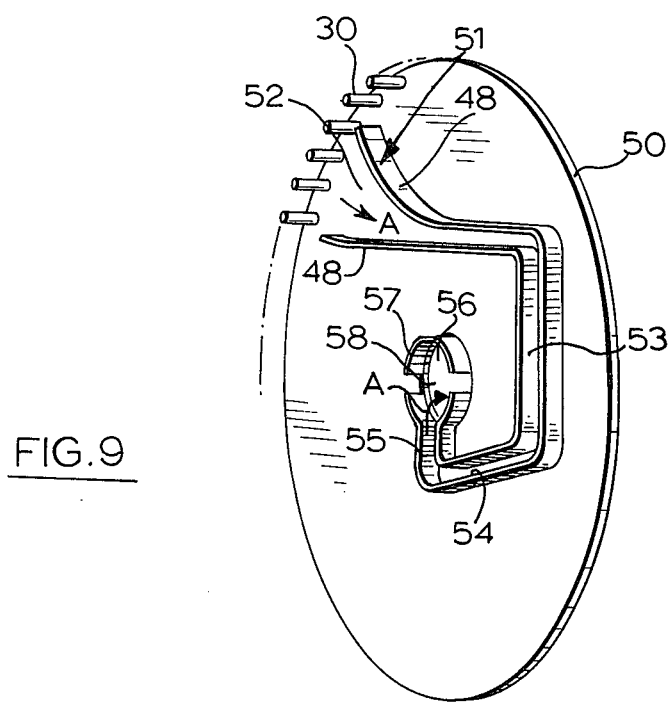
FIG. 9 is a perspective view showing a portion of the pump of FIG. 1.

The left hand end of the rotor 10 as drawn is the inlet end, and the right hand end is the outlet end. In the embodiment illustrated, air and liquid are forced through the rotor as follows. A spiral pump 47 is provided at the inlet end of the rotor 10. The spiral pump 47 is diagrammaticall indicated as being formed from a number of spiral straps 48 inserted between end plate 14 and a spaced parallel disc 50. The arrangement of the straps 48 is shown in FIG. 6, where it will be seen that they are arranged to form a number of intake horns 51. FIG. 9 shows a single such intake horn 51. Each intake horn 51 has a generally tangential inlet portion 52, and two transfer portions 53, 54, each oriented generally at right angles to the preceding portion, and an outlet portion 55 which feeds air and liquid into the central area 56 of the space between the discs 49, 50. In effect, each horn 51 thus has an inwardly spiralling configuration.

The central area 56 between discs 49, 50 is closed by an annular strap 57 through which the outlet portions 55 project. In operation, when the rotor 10 rotates, the inlet portions 52 are periodically submerged below the liquid level, so that a volume of liquid enters the inlet portions. As the rotor continues to rotate (in the direction of the arrow, FIG. 6), the liquid volume which has been enclosed in the inlet portions runs through the transfer and outlet portions 53, 54, 55 and into the space 56. The direction of flow is indicated by arrows A in FIG. 9. When the inlet portions 52 rotate back into the liquid, a volume of air is trapped within them and is in the same manner pumped into the space 56. The air and liquid then exit from the space 56 into the main body of the rotor via an opening 58 in disc 50.

Liquid and air exit from the rotor 10 via an outlet opening 62 in the right hand axle 18. The treated liquid is conducted via a funnel 64 and flexible hose 66 through the wall of tank 4, for disposal in any desired manner.

The flows of air and water through the rotor are indicated by arrowed lines 68, 69 in FIG. 2. It will be seen that these flow paths are in zig-zag lines through the rotor, i.e. they are tortuous. In addition, as the corrugated disc elements 32, 34 rotate in the liquid, they pick up a film of liquid which then runs back down to the liquid level in the rotor, through the channels 36 formed by the crossed corrugations. The resultant movement and agitation of the air and liquid within the rotor represents a more efficient use of the biologically active surfaces in the rotor.

The liquid level in the rotor is determined partly by the rate at which liquid is pumped into the rotor, and partly by the diameters of the openings 58, 62. In addition, as shown in FIG. 2, a drain opening 70 may be provided in axle 18 at the inlet end of the rotor, to return excess liquid to the tank. An adjustable valve (not shown) may be placed in the drain opening 70, to control precisely the amount of liquid returned. This gives additional control over the air-water ratio fed into the rotor. In addition, by over-dimensioning the spiral pump 50 to pump excess water and air, and by providing the return or drain outlet 70 at the inlet end for excess liquid to return to the tank, the air flow through the rotor can be increased. The diameters of the centre holes 44 in the disc elements and of the openings, 58, 62 and 70 can be made to provide such a high liquid level in the rotor (above the top of opening 58) that the air which is pumped into the rotor cannot return out with the excess liquid but is forced through the rotor.

It will be seen that the intake horns 51 pump metered amounts of both liquid and air into the rotor 10, so that the ratio of air to liquid fed through the rotor can be closely controlled. Typically the ratio is 20 parts of air to 1 part of water (by volume), for treatment of waste water. As previously indicated, adjustment can be carried out by varying the opening of drain opening 70.

It will be appreciated that various modifications may be made in the structure described. For example, the pumps used to force air and liquid through the rotor 10 may be entirely separate and independent of the rotor, or supplementary pumps may be used to supplement the action of the spiral pump 50. For example, and as shown in FIG. 2, an air pump 80 may be provided, connected to an air duct 82 which pumps further air through the axle 18 into the rotor. The air pressure in the rotor is instrumental in forcing the liquid through the rotor so that the level within the rotor can be kept nearly horizontal despite a substantial pressure drop in the rotor. In the absence of air pump 82, or of any other supplementary pump, the open end of the left hand axle 18 would of course be closed.

The pressure drop within the rotor may if desired be reduced by employing screw pump discs (which operate as spiral pumps) between some of the disc elements 32, 34. A further way of decreasing the pressure drop is provided by the arrangement shown in FIG. 7. In FIG. 7, a third type of disc element 84 is provided, several of such disc elements being located between at least some of the disc elements 32, 34. The disc elements 84 have both central holes 44 and spaces 46 at their peripheries and provide parallel channels 86 through which liquid and air may flow.

The arrangement of corrugations in the disc elements may vary, and indeed the corrugations can be eliminated although it is preferred that corrugations be used. The corrugations need not extend across the entire area of a disc element, and they need not be parallel to each other in each disc element; for example, they may be radial, or they may be radial with a tangential component. Preferably the corrugations of adjacent discs will be located at an angle to each other, to provide adequate support points at which the disc elements can contact each other and to define channels between the disc elements; otherwise spacer elements would be required between the disc elements. If the disc element corrugations are radial with a tangential component, then adjacent disc elements may have their tangential components oriented in opposite directions, again to provide support points.

The rotor 10 may be supported by a stand instead of by a raft, and it may be journalled by bearings on its outer wall 12, rather than on the axles 18.

If desired, the disc elements within the rotor may be secured together by means other than their tight enclosure within the housing of the rotor. For example, they may be secured together as an assembly by long bolts passed therethrough, and axle members may then be secured to each end of the assembly for rotation of the disc element assembly within the housing. In such event, the housing may remain stationary. If the housing is stationary, the lower half of the housing may assume the shape of a semi-cylindrical shall or trough encircling or enclosing the lower half of the disc assembly, while the upper half of the disc assembly may be enclosed by the upper wall of the tank 2.

What I claim is:

1. Apparatus for the biological treatment of waste liquid, said apparatus including an elongated substantially circular housing for containing said liquid, said housing having an inlet opening, an outlet opening, and a central axis, a stack of disc elements in said housing and positioned substantially parallel to each other and at right angles to said axis, some of said disc elements have central apertures at said axis and fitting closely at their peripheries to said housing to prevent passage of liquid therebetween, others of said disc elements being closed at their centres and defining second apertures located at their peripheries adjacent said housing said housing including both such types of disc elements alternating with each other, adjacent disc elements defining channels therebetween, and means for rotating said disc elements in the liquid in said housing, whereby liquid and air impelled into said housing through said inlet opening will flow through said housing to said outlet opening in respective revolving tortuous paths, and means for rotating said disc elements in the liquid in said housing.

2. Apparatus according to claim 1 wherein at least some of said disc elements contain corrugations therein.

3. Apparatus according to claim 1 wherein said first mentioned and said second disc elements include corrugations therein, said disc elements being disposed co-axially and with adjacent disc elements abutting against each other, the corrugations of each disc element being oriented at an angle to the corrugations of the adjacent disc element, so that adjacent disc elements contact each other at a plurality of points, the corrugations of adjacent disc elements defining said channels.

4. Apparatus according to claim 3 wherein in each disc element the said corrugations thereof are all parallel to each other and extend across substantially the entire area of the disc element, said angle being a right angle.

5. Apparatus according to claim 4 wherein said others of said disc elements are of smaller diameter than said first mentioned disc elements, said second apertures extending entirely around the peripheries of said others of said disc elements.

6. Apparatus according to claim 3 wherein said disc elements are fixed in said housing, said means for rotating being connected to said housing to rotate said housing.

7. Apparatus according to claim 1 wherein said disc elements are fixed in said housing, said means for rotating being connected to said housing to rotate said housing, said housing including pump means fixed to said inlet end and rotating with said housing for forcing water and air into said housing during rotation of said housing when the latter is partly immersed in said liquid.

8. Apparatus according to claim 7 and further including a separate air pump connected to said inlet end for forcing additional air into said housing.

9. Apparatus according to claim 1 wherein said housing includes a drain opening at said inlet end for draining excess liquids from said housing, said drain opening being separate and distinct from said inlet opening and said drain opening being located adjacent said axis.

10. Apparatus according to claim 1 wherein said disc elements include a third disc element having a central axial aperture and defining an aperture located radially outwardly of said axis, said third disc element being located between one of said first mentioned disc elements and one of said others of said disc elements.

11. Apparatus according to claim 7 wherein said pump means comprises a plurality of intake horns each having an intake portion, a transfer portion, and an outlet portion directed into said housing, said intake, transfer and outlet portions of each horn being arranged in an inwardly spiralling configuration, said intake portions being located to dip into said liquid as said rotor rotates, whereby said horns alternately pump water and air into said housing as said housing rotates.

12. Apparatus according to claim 11 wherein said housing includes a drain opening at said inlet end for draining excess liquid from said housing, said drain opening being separate and distinct from said inlet opening and said drain opening being located adjacent said axis.

* * * * *